(12) United States Patent
Lethellier

(10) Patent No.: US 10,978,245 B2
(45) Date of Patent: Apr. 13, 2021

(54) LOW VOLTAGE WIRELESS POWER TRANSFER PAD

(71) Applicant: Wireless Advanced Vehicle Electrification, Inc., Salt Lake City, UT (US)

(72) Inventor: Patrice Lethellier, Herriman, UT (US)

(73) Assignee: WIRELESS ADVANCED VEHICLE ELECTRIFICATION, INC., Salt Lake City, UT (US)

(*) Notice: Subject to any disclaimer, the term of this patent is extended or adjusted under 35 U.S.C. 154(b) by 228 days.

(21) Appl. No.: 16/103,512

(22) Filed: Aug. 14, 2018

(65) Prior Publication Data

US 2019/0051452 A1 Feb. 14, 2019

Related U.S. Application Data

(60) Provisional application No. 62/544,988, filed on Aug. 14, 2017.

(51) Int. Cl.
| | |
|---|---|
| *H01F 38/14* | (2006.01) |
| *H02J 50/12* | (2016.01) |
| *H01F 27/40* | (2006.01) |
| *H02J 7/02* | (2016.01) |
| *B60L 53/12* | (2019.01) |

(52) U.S. Cl.
CPC .............. *H01F 38/14* (2013.01); *H01F 27/40* (2013.01); *H02J 50/12* (2016.02); *B60L 53/12* (2019.02); *H02J 7/025* (2013.01)

(58) Field of Classification Search
CPC . B60L 53/12; H02J 7/025; H02J 50/12; H01F 38/14; H01F 27/40
See application file for complete search history.

(56) References Cited

U.S. PATENT DOCUMENTS

| | | | | |
|---|---|---|---|---|
| 9,530,556 | B2* | 12/2016 | Davila | H02J 5/005 |
| 2012/0146580 | A1* | 6/2012 | Kitamura | G01V 3/102 |
| | | | | 320/108 |
| 2013/0127253 | A1* | 5/2013 | Stark | H02J 7/025 |
| | | | | 307/104 |
| 2015/0028478 | A1* | 1/2015 | Meyer | H01L 25/0655 |
| | | | | 257/738 |
| 2017/0271924 | A1* | 9/2017 | Mao | H03M 1/1245 |
| 2017/0324281 | A1* | 11/2017 | Che | H01F 38/14 |
| 2018/0040416 | A1* | 2/2018 | Lestoquoy | H02J 50/12 |
| 2018/0062421 | A1* | 3/2018 | Danilovic | H02M 3/24 |

(Continued)

OTHER PUBLICATIONS

MD Rubel Basar et al., Application of Wireless Power Transmission Systems in Wireless Capsule Endoscopy: An Overview. Sensor, 2014, 14, pp. 10932-10934.

(Continued)

*Primary Examiner* — Jared Fureman
*Assistant Examiner* — Esayas G Yeshaw
(74) *Attorney, Agent, or Firm* — Kunzler Bean & Adamson; Bruce R. Needham

(57) ABSTRACT

A wireless power transfer ("WPT") pad includes a plurality of capacitors and a winding shaped for wireless power transfer. The winding is divided into a plurality of winding sections. The plurality of winding sections are connected in series with one or more capacitors of the plurality of capacitors connected in series between winding sections.

16 Claims, 7 Drawing Sheets

(56) References Cited

U.S. PATENT DOCUMENTS

2019/0198239 A1* 6/2019 Xu .......................... H01F 38/14

OTHER PUBLICATIONS

Kishore Naik Mude et al., Design and experimentation of two-coil coupling for electric city-car WPT charging, Journal of Electromagnetic Waves and Applications, Nov. 29, 2015, p. 3.

Kaczmarczyk Z. et al., A multi-coil wireless power transfer (MC-WPT) system—analysis method and properties, Measurement Automation Monitoring, Oct. 2015, vol. 61, No. 10, pp. 480-482.

PCT Application No. PCT/US2018/046757, filed Aug. 14, 2018, International Search Report and Written Opinion dated Nov. 8, 2018.

\* cited by examiner

LOW VOLTAGE WIRELESS POWER TRANSFER PAD

CROSS-REFERENCES TO RELATED APPLICATIONS

This application claims the benefit of U.S. Provisional Patent Application No. 62/544,988 entitled "Low Voltage Wireless Power Transfer Pad" and filed on Aug. 14, 2017 for Patrice Lethellier, which is incorporated herein by reference.

FIELD

This invention relates to wireless power transfer and more particularly relates to a low voltage wireless power transfer pad.

BACKGROUND

Wireless power transfer is becoming increasingly popular. Wireless power transfer involves transmitting power from a primary pad located on a stationary wireless power transfer device, such as a charging station, to a secondary pad on a mobile device, such as an electric vehicle, over a significant gap. The gap typically includes an air gap and can be significant. For example, the air gap may be from ground level to a secondary pad located under a vehicle. An air gap in the range of six inches to 10 inches is not uncommon. As the amount of power transferred over an air gap increases, voltages for transmission and reception systems has increased. One method of wireless power transfer includes using a resonant tank, which often boosts voltages of a wireless power transfer pad, which increases voltage ratings of components used for the equipment.

SUMMARY

A wireless power transfer ("WPT") pad includes a plurality of capacitors and a winding shaped for wireless power transfer. The winding is divided into a plurality of winding sections. The plurality of winding sections are connected in series with one or more capacitors of the plurality of capacitors connected in series between winding sections.

Another WPT pad includes a plurality of capacitors, where one or more capacitors of the plurality of capacitors form a capacitor group, and where the plurality of capacitors form a plurality of capacitor groups, and a winding shaped for wireless power transfer. The winding is divided into a plurality of winding sections. The winding sections and the capacitor groups are connected in series forming a series-connected winding that include the winding sections and the capacitor groups and a capacitor group of the plurality of capacitor groups is connected in series between two winding sections.

A WPT system includes a rectification circuit that receives alternating current ("AC") power and produces direct current ("DC") power, a resonant converter that receives the DC power, and a WPT pad connected to the resonant converter that transfers power wirelessly to a secondary WPT pad. The WPT pad includes a plurality of capacitors. One or more capacitors of the plurality of capacitors form a capacitor group. The plurality of capacitors form a plurality of capacitor groups, and each capacitor group is identical. The WPT pad includes a winding shaped for wireless power transfer. The winding is divided into a plurality of winding sections. The winding sections and the capacitor groups are connected in series forming a series-connected winding that include the winding sections and the capacitor groups. A capacitor group of the plurality of capacitor groups is connected in series between two winding sections.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
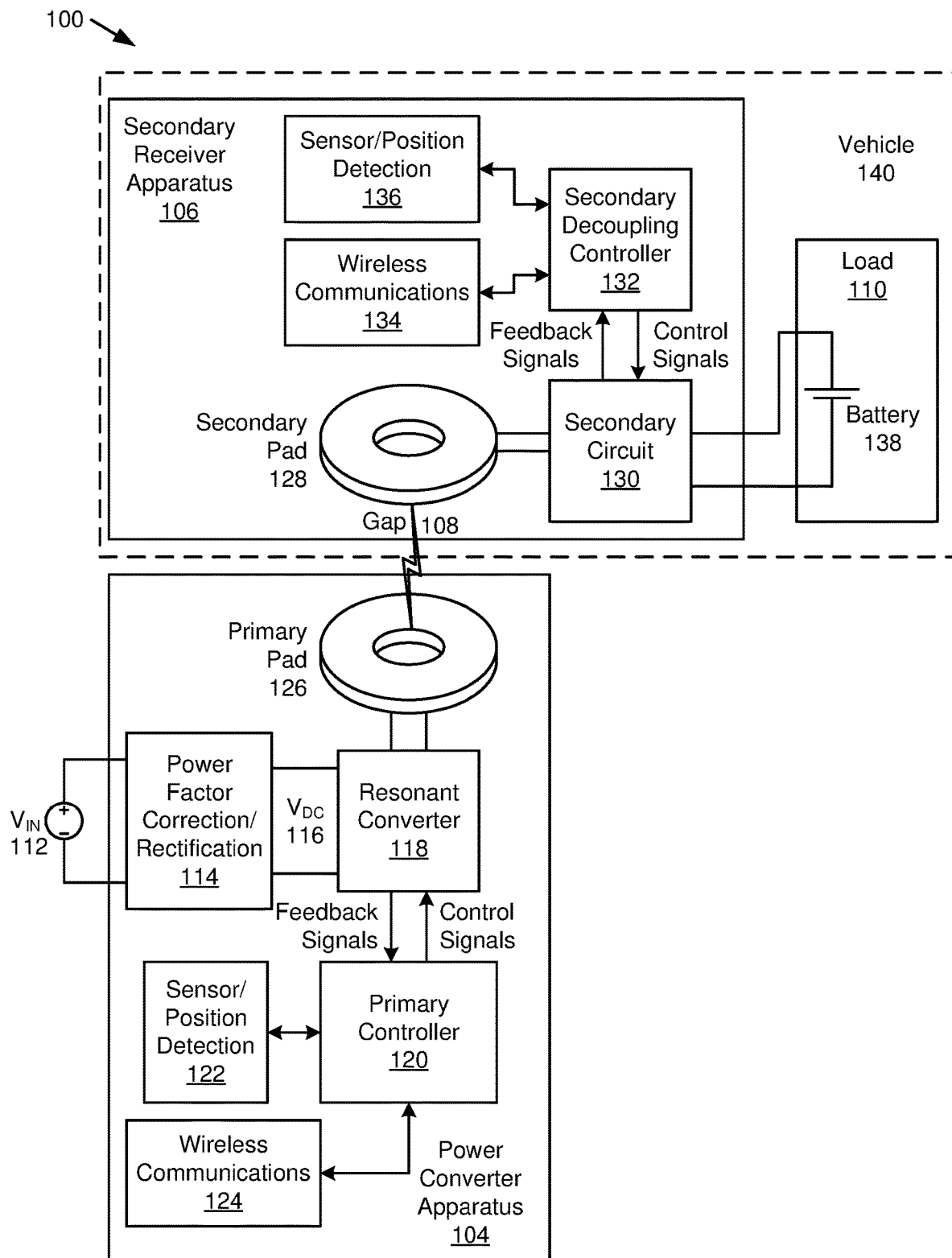
FIG. 1 is a schematic block diagram illustrating one embodiment of a system with a low voltage wireless power transfer ("WPT") pad.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A wireless power transfer ("WPT") pad includes a plurality of capacitors and a winding shaped for wireless power transfer. The winding is divided into a plurality of winding sections. The plurality of winding sections are connected in series with one or more capacitors of the plurality of capacitors connected in series between winding sections.

In some embodiments, the winding includes a pad inductance and the capacitors of the plurality of capacitors connected in series form a pad capacitance and the pad inductance and the pad capacitance form a resonant frequency, where an alternating current ("AC") in the WPT pad resonates with respect to the resonant frequency to transfer power wirelessly through the WPT pad. In other embodiments, two or more capacitors of the plurality of capacitors are connected between winding sections and form a desired capacitance. In a further embodiment, the two or more capacitors connected between winding sections have an overall current rating above a specified current value.

In some embodiments, the winding sections are wound in a spiral pattern that expands away from a center starting point. In other embodiments, the winding sections are wound in parallel. In other embodiments, each capacitor of the plurality of capacitors is located in a container adjacent to the winding sections. In other embodiments, the winding sections are wound around a center section and each capacitor of the plurality of capacitors is located in the center section.

In some embodiments, a first winding section of the plurality of winding sections is connected to a first terminal and a last section of the plurality of winding sections is connected to a second terminal, where the first and second terminals form an input to the WPT pad. In other embodiments, an end of the first winding section and the last winding section not connected to the first and second terminals are connected to one or more capacitors of the plurality of capacitors. In other embodiments, one or more capacitors of the plurality of capacitors which are connected between winding sections form a capacitor group. In other embodiments, the WPT pad includes a capacitor group that includes one or more capacitors of the plurality of capacitors connected between a winding section and a terminal.

Another WPT pad includes a plurality of capacitors, where one or more capacitors of the plurality of capacitors form a capacitor group, and where the plurality of capacitors form a plurality of capacitor groups, and a winding shaped for wireless power transfer. The winding is divided into a plurality of winding sections. The winding sections and the capacitor groups are connected in series forming a series-connected winding that include the winding sections and the capacitor groups and a capacitor group of the plurality of capacitor groups is connected in series between two winding sections.

In some embodiments, the winding includes a pad inductance and the capacitors of the plurality of capacitors form a pad capacitance and the pad inductance and the pad capacitance form a resonant frequency where an alternating current ("AC") in the WPT pad resonates with respect to the resonant frequency to transfer power wirelessly through the WPT pad. In other embodiments, each capacitor group is identical. In other embodiments, each capacitor group includes two or more capacitors and an overall current rating of each capacitor group is greater than or equal to a current rating of a winding section. In other embodiments, the winding sections are wound in a spiral pattern that expands away from a center starting point. In other embodiments, the winding sections are wound in parallel. In other embodiments, a first winding section of the plurality of winding sections is connected to a first terminal and a last section of the plurality of winding sections is connected to a second terminal. The first and second terminals form an input to the WPT pad and an end of the first winding section and the last winding section not connected to the first and second terminals are connected to a capacitance group of the plurality of capacitance groups.

A WPT system includes a rectification circuit that receives alternating current ("AC") power and produces direct current ("DC") power, a resonant converter that receives the DC power, and a WPT pad connected to the resonant converter that transfers power wirelessly to a secondary WPT pad. The WPT pad includes a plurality of capacitors. One or more capacitors of the plurality of capacitors form a capacitor group. The plurality of capacitors form a plurality of capacitor groups, and each capacitor group is identical. The WPT pad includes a winding shaped for wireless power transfer. The winding is divided into a plurality of winding sections. The winding sections and the capacitor groups are connected in series forming a series-connected winding that include the winding sections and the capacitor groups. A capacitor group of the plurality of capacitor groups is connected in series between two winding sections.

FIG. 1 is a schematic block diagram illustrating one embodiment of a wireless power transfer ("WPT") system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, includes a resonant converter 118 that receives DC voltage from a DC bus 116. In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary WPT pad 126 that receives power from the resonant converter 118. In one embodiment, portions of the resonant converter 118 and primary WPT pad 126 form a resonant circuit that enables efficient wireless power transfer across the gap 108. The gap 108, in some embodiments includes an air gap, but may also may partially or totally include other substances. For example, where the primary WPT pad 126 is in a roadway, the gap 108 may include a resin, asphalt, concrete or other material just over the windings of the primary WPT pad 126 in addition to air, snow, water, etc. between the primary WPT pad 126 and a secondary WPT pad 128 located in the secondary receiver apparatus 106. As used herein, a WPT pad may be a primary WPT pad 126 or a secondary WPT pad 128.

The secondary receiver apparatus 106 includes a secondary WPT pad 128 connected to a secondary circuit 130 that delivers power to the load 110. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other load that would benefit from receiving power wirelessly.

In one embodiment, the secondary circuit 130 includes a portion of resonant circuit that interacts with the secondary WPT pad 128 and that is designed to receive power at a resonant frequency. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary WPT pad 128 and delivering power to the load 110.

The resonant converter 118, in one embodiment, includes an active switching section coupled to a resonant circuit formed with components of the resonant converter 118 and the primary WPT pad 126. The resonant converter 118 is described in more detail with regard to FIG. 2.

Figure 2:
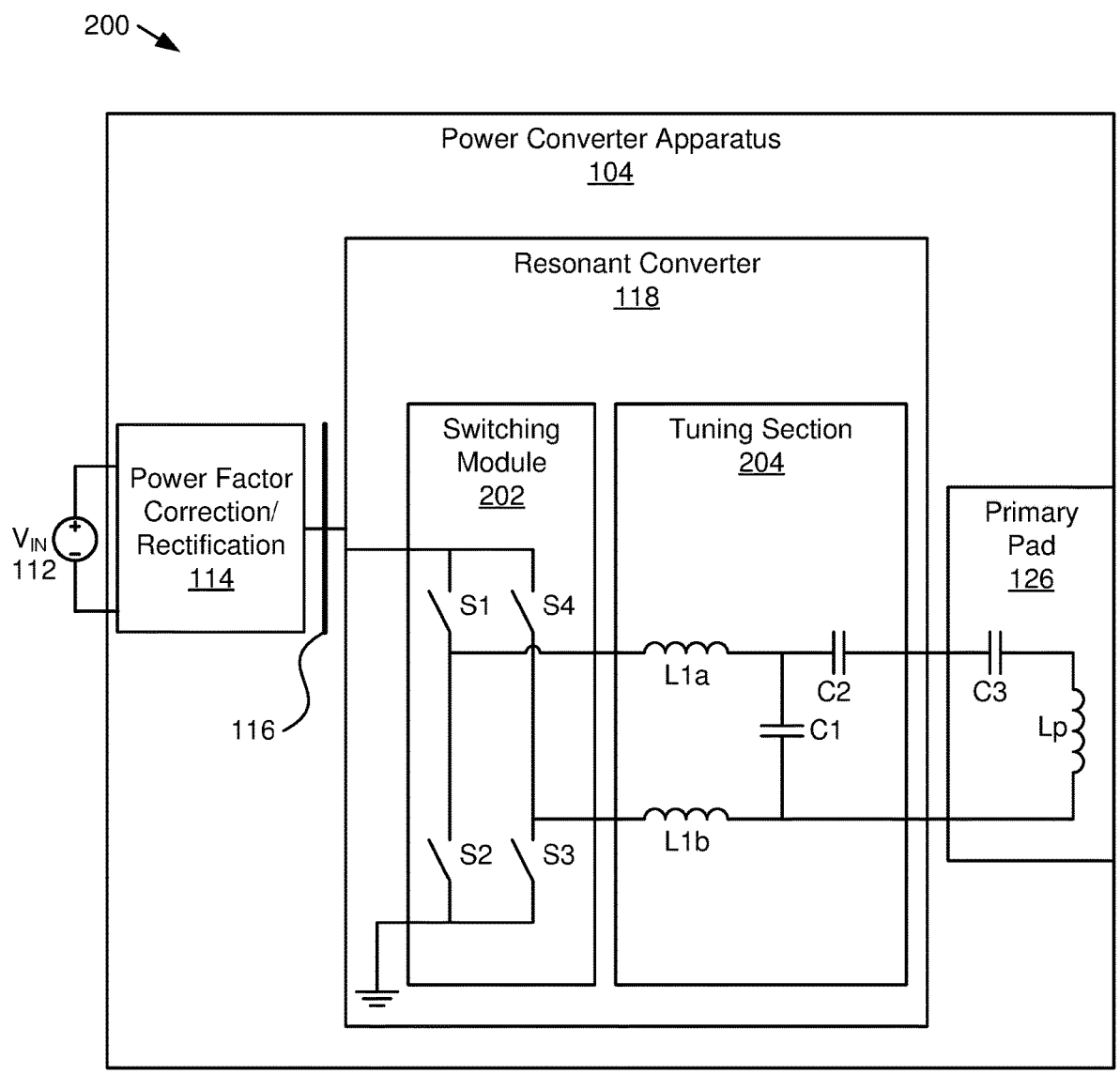
FIG. 2 is a schematic block diagram illustrating one embodiment of a power converter apparatus.

FIG. 2 is a schematic block diagram illustrating one embodiment of a power converter apparatus 104. The power converter apparatus 104 is connected to a power source 112 and includes a power factor correction and rectification circuit 114 connected to a DC bus 116 feeding a resonant converter 118 connected to a primary WPT pad 126 as described with regard to the WPT system 100 of FIG. 1.

The resonant converter 118 includes a switching module 202 and a tuning section 204. The switching module 202, includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section simulating an AC waveform. The AC waveform typically imperfect due to harmonics.

Typically switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations and switching loss reduction, such as zero-voltage switching. In other embodiments, snubbers and other components are used to reduce switching losses.

The tuning section 204 of the resonant converter 118 and the primary WPT pad 126 are designed based on a chosen topology. For example, the resonant converter 118 and primary WPT pad 126 may form an inductor-capacitor-inductor ("LCL") load resonant converter, a series resonant converter, a parallel resonant converter, and the like. The embodiment depicted in FIG. 2 includes an LCL load resonant converter.

Resonant converters include an inductance and capacitance that form a resonant frequency. When a switching frequency of the tuning section 204 is at or close to the resonant frequency, voltage with the tuning section 204 and primary WPT pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

Figure 4:
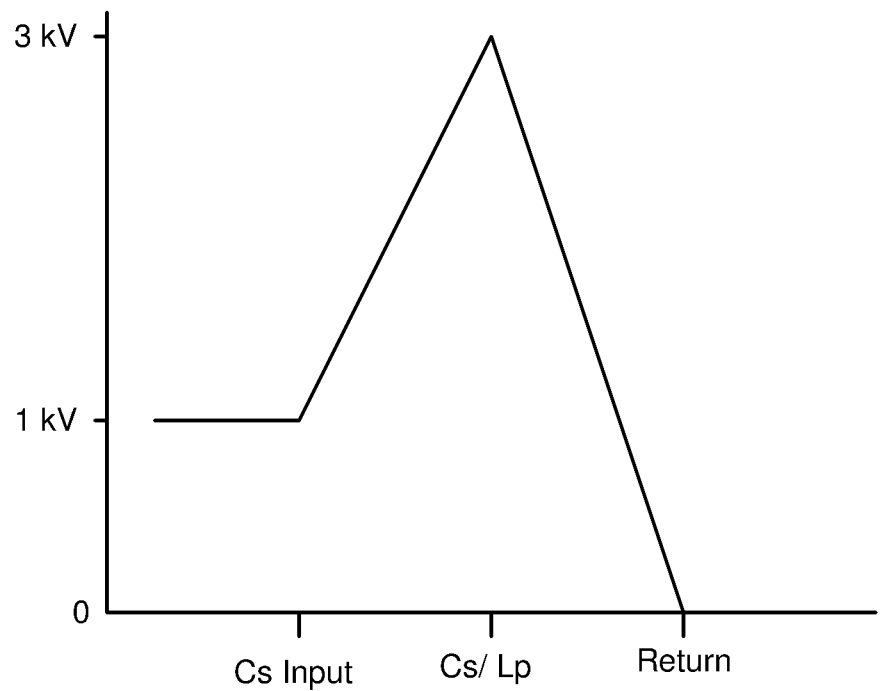
FIG. 4 is a graph indicating voltage changes within a typical prior art WPT pad.

The primary WPT pad 126 includes capacitor C3 and inductor Lp while the tuning section 204 includes series capacitor C2. Capacitors C2 and C3 add to provide a particular capacitance that forms a resonant frequency with inductor Lp. FIG. 4 is a graph indicating voltage changes within a typical prior art WPT pad, such as the primary WPT pad 126 depicted in FIG. 2. Assuming that capacitors C2 and C3 are combined to form capacitor Cs, the voltage at the input to the primary WPT pad 126, which is the left side of the Cs capacitor is 1 kV in this example. For example, an AC waveform may be applied to the WPT pad with a peak voltage of 1 kV. The voltage at the junction between the Cs capacitor and the Lp inductor is 3 kV when the input voltage is 1 kV and the voltage at the other end of the Lp inductor is zero volts, ignoring any voltage drop across inductor L1b. Components of the WPT pad must then be rated for the expected 3 kV, which may dictate using expensive components.

While the FIG. 2 is focused on the resonant converter 118 and primary WPT pad 126, the secondary receiver apparatus 106 includes a secondary WPT pad 128 and a secondary circuit 130 that typically includes a tuning section where the inductance of the secondary WPT pad 128 and capacitance of the tuning section of the secondary circuit 130 form a resonant frequency and the secondary WPT pad 128 and secondary circuit 130 have voltage issues similar to the primary WPT pad 126 and resonant converter 118.

Figure 3:
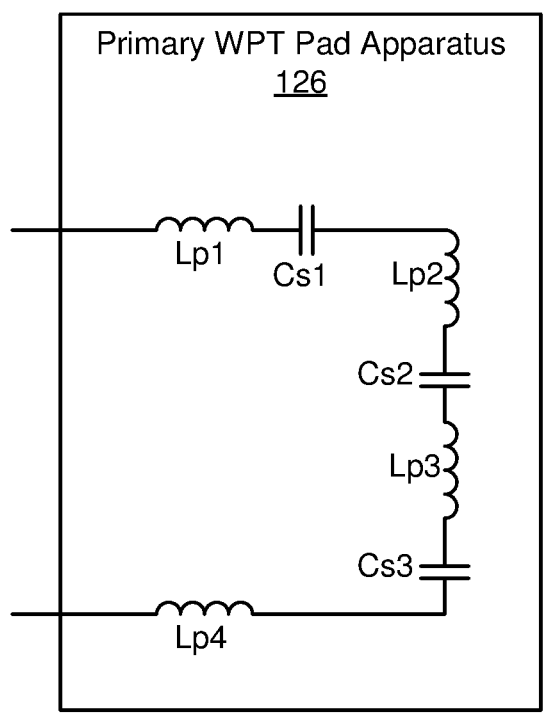
FIG. 3 is a schematic block diagram illustrating one embodiment of a low voltage WPT pad.

FIG. 3 is a schematic block diagram illustrating one embodiment of a low voltage WPT pad. As used herein, a low voltage WPT pad means that voltage of the low voltage WPT pad is lower than voltage across a typical WPT pad and the term "low voltage" does not refer to a particular voltage limit or voltage standard. In the embodiment, the capacitance Cs has been distributed in three capacitors, Cs1, Cs2 and Cs3. The winding of the primary WPT pad 126, which forms an inductance, is divided into four winding sections, Lp1, Lp2, Lp3, Lp4. The capacitors Cs1, Cs2 and Cs3 are distributed between winding sections as depicted. While three capacitors and four winding sections are depicted, one of skill in the art will recognize that other numbers of capacitors and winding sections may be used. While the WPT pad of FIG. 3 is depicted as a primary WPT pad 126, the topology depicted in FIG. 3 may also be used on a secondary WPT pad 128. The embodiment depicted in FIG. 3 includes one more inductor section (e.g. four inductors Lp1-4) than the number of capacitors (e.g. Cs1-3). In other embodiments, a WPT pad may include a same number of capacitors and inductance sections where one capacitor (e.g. a Cs4 capacitor) is connected between a terminal and a last inductance section Lp4.

Figure 5:
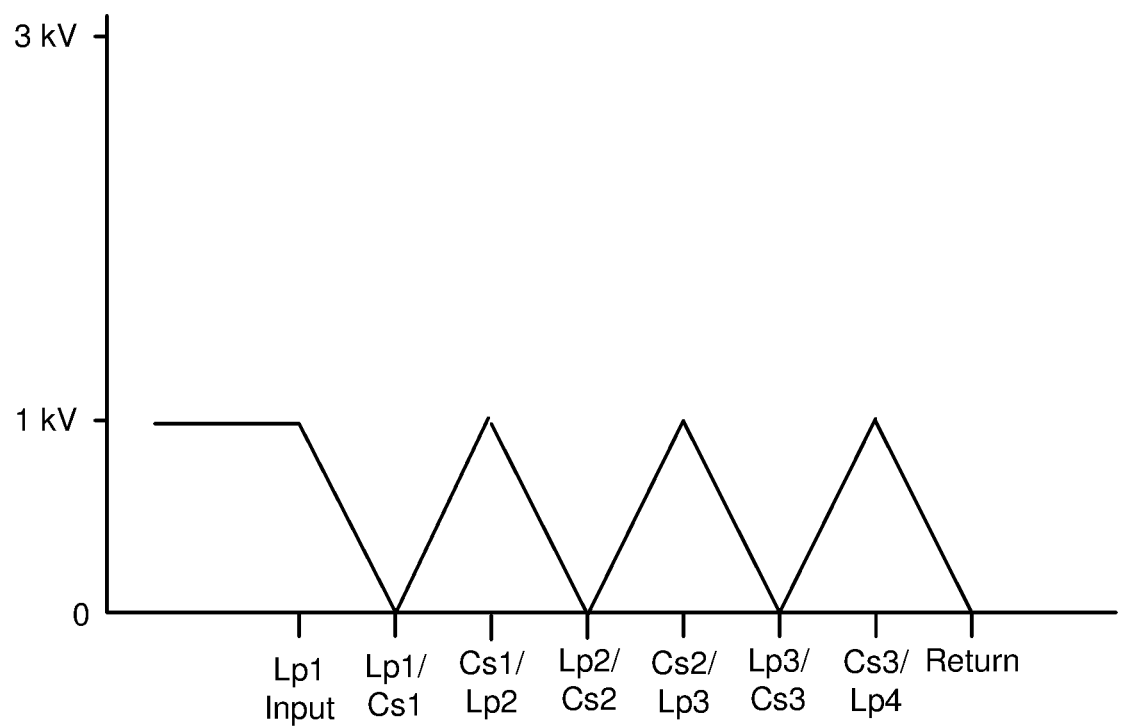
FIG. 5 is a graph indicating voltage changes within one embodiment of a low voltage WPT pad.

FIG. 5 is a graph indicating voltage changes within one embodiment of a low voltage WPT pad, for example in the low voltage WPT pad of FIG. 3. The voltage at the input, which is the left side of inductor Lp1 is 1 kV, which is the same as for FIG. 4. Voltage is dropped across inductor Lp1 so that at the LP1/Cs1 junction the voltage is zero. Voltage at the Cs1/Lp2 is again at 1 kV and is again at zero at the Lp2/Cs2 junction. Voltage at the Cs2/Lp3 is again at 1 kV and is again at zero at the Lp3/Cs3 junction. Voltage at the Cs3/Lp4 is again at 1 kV and is again at zero at the return (again ignoring any voltage drop across inductor L1b if provided). Thus, voltage in the primary WPT pad 126 depicted in FIG. 3 is reduced, which increases safety and allows components to have a lower voltage rating.

Note that the inductance Lp and capacitance Cs of the primary WPT pad 126, in one embodiment, are a result of the design of the primary WPT pad 126, a desired resonant frequency, and other factors. The number of winding sections and capacitors are chosen based on factors, such as physical dimensions of the primary WPT pad 126, conductor size, etc. The low voltage primary WPT pad 126 depicted in FIG. 3 may also be used for the secondary WPT pad 128 and the principles discussed with regard to the low voltage WPT pad of FIG. 3 are equally applicable to the secondary receiver apparatus 106.

Figure 6:
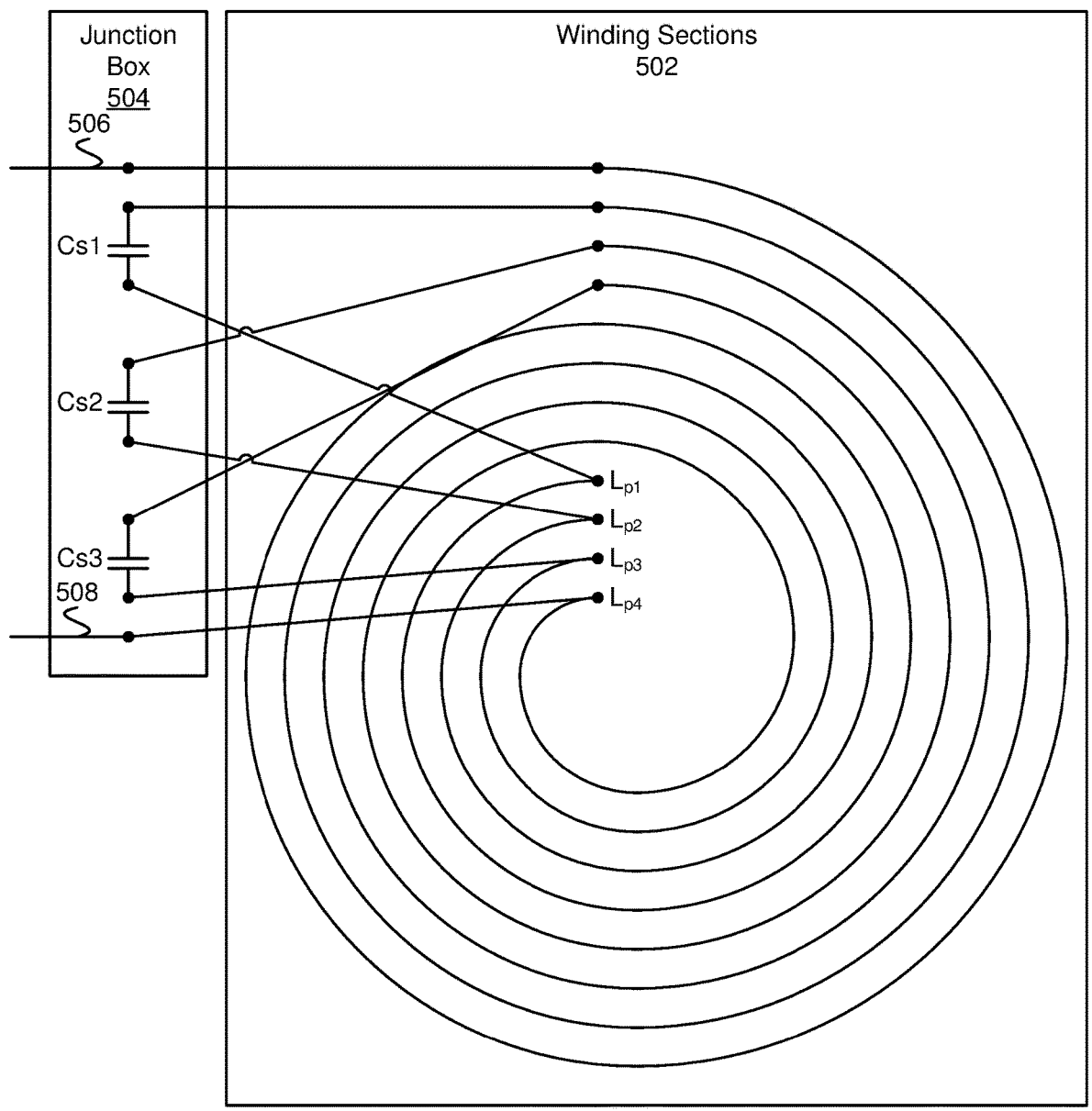
FIG. 6 is a schematic block diagram of an embodiment of a layout of a WPT pad with capacitors in a junction box to the side of winding sections.

FIG. 6 is a schematic block diagram of one embodiment of a layout of a WPT pad with capacitors Cs1, Cs2 and Cs3 in a junction box 504 to the side of winding sections 502. The winding sections 502 are wound in a spiral pattern that expands away from a center starting point. Note that each winding section (e.g. Lp1-4) are depicted with two turns for clarity, but one of skill in the art will recognize that a WPT winding may include any number of turns. The winding sections 502 includes a first winding section Lp1, a second winding section Lp2, a third winding section Lp3 and a fourth winding section Lp4 wound in parallel with connections to capacitors Cs1, Cs2 and Cs3. The capacitors Cs1, Cs2 and Cs3 are located to the side of the winding sections 502 in a junction box 504. Having the capacitors in a junction box is convenient for replacement of the capacitors and is a convenient place for making connections, which may be configured to be water resistant. The junction box 504 may include lid on top that may be removed to gain access to the capacitors Cs1, Cs2 and Cs3. The junction box 504 may include grommets or similar penetrations for conductors entering and leaving the junction box 504. While an input conductor 506 and a return conductor 508 are depicted leaving the junction box 504 at separate locations, typically the conductors 506, 508 would be in a conduit that runs to the resonant converter 118.

Figure 7:
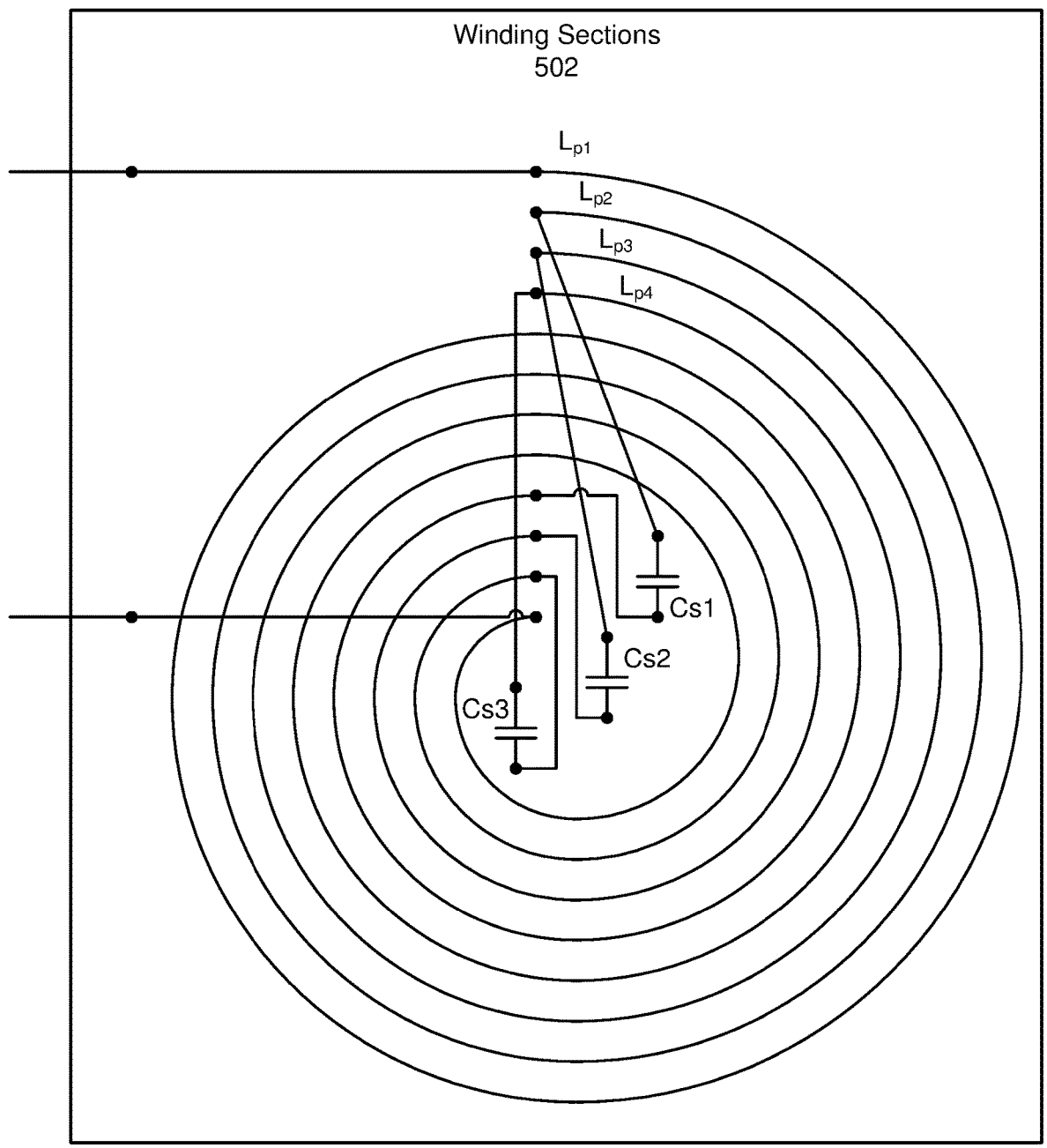
FIG. 7 is a schematic block diagram of an embodiment of a layout of a WPT pad with capacitors in a center of winding sections.

FIG. 7 is a schematic block diagram of an embodiment of a layout of a WPT pad with capacitors Cs1, Cs2 and Cs3 in a center of winding sections 502. As in FIG. 6, the winding sections 502 includes a first winding section Lp1, a second winding section Lp2, a third winding section Lp3 and a fourth winding section Lp4 wound in parallel with connections to capacitors Cs1, Cs2 and Cs3. The capacitors Cs1, Cs2 and Cs3 are located in the center of the winding sections 502. Typically, the winding sections 502 have a center section that is open due to the physical geometry of the conductors, magnetics, etc. The center of the winding sections 502 is typically an unused space. Placing the capacitors Cs1, Cs2 and Cs3 in the center of the winding sections 502 reduces the overall size of the primary WPT pad 126. In one embodiment, the capacitors Cs1, Cs2 and Cs3 are molded into the center of the winding sections 502 and are surrounded by a resin or other material. In another embodiment, the capacitors Cs1, Cs2 and Cs3 are accessible. For example, the capacitors Cs1, Cs2 and Cs3 may be located in a junction box or other structure within the center of the winding sections 502. In other embodiments, some capacitors are located in a center section and some capacitors are located elsewhere.

Figure 8:
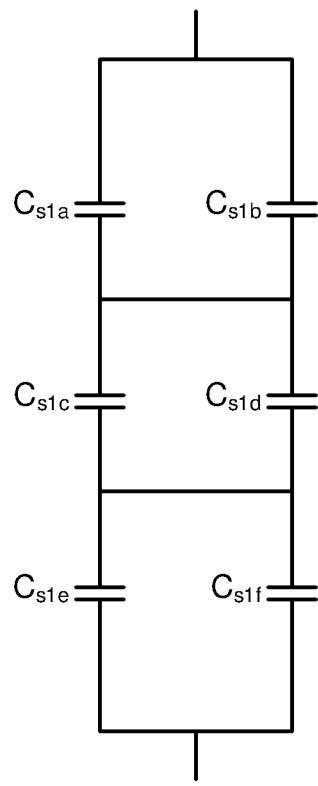
FIG. 8 is a schematic block diagram illustrating one configuration of capacitors that make up one of the capacitors depicted in the embodiments of FIGS. 3, 6 and 7.

FIG. 8 is a schematic block diagram illustrating one configuration of capacitors that make up one of the capacitors (e.g. Cs1) depicted in the embodiments of FIGS. 3, 6 and 7. In one embodiment, the capacitors (e.g. Cs1) depicted in the embodiments of FIGS. 3, 6 and 7 may each be a capacitor group. A capacitor group, such as Cs1 may be made up of multiple capacitors, i.e. Cs1a, Cs1b, Cs1c, Cs1d, Cs1e and Cs1d to meet current requirements, voltage requirements, etc. A capacitor group as used herein, refers to a group of capacitors (e.g. Cs1) connected between two winding sections (e.g. Lp1, Lp2). For example, a single capacitor Cs1 may not be capable of handling current requirements based on size considerations, capacitors that are commercially available, voltage ratings, etc. While six capacitors Cs1a-d are depicted in FIG. 8, one of skill in the art will recognize other capacitor configurations, with more capacitors in parallel, more or less capacitors in series, etc.

Where two or more capacitors are used in a capacitor group, the capacitance of each capacitor and the associated series/parallel configuration of the capacitors form a particular capacitance which is grouped with the other capacitor groups of a WPT pad to form a desired pad capacitance. The pad capacitance along with a pad inductance form a desired resonant frequency. A designer, in some embodiments, uses a specified current value for a capacitor group along with a desired capacitance of the capacitor group to identify a topology of capacitors of the capacitor group. For example, the specified current value may be current above a designed maximum current of a WPT pad.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wireless power transfer ("WPT") pad comprising:
a plurality of capacitors; and
a winding shaped for wireless power transfer, the winding divided into a plurality of winding sections,
wherein the plurality of winding sections are connected in series with one or more capacitors of the plurality of capacitors connected in series between winding sections,
wherein the winding sections are wound in parallel and in a spiral pattern that expands away from a center starting point.

2. The WPT pad of claim 1, wherein the winding comprises a pad inductance and the capacitors of the plurality of capacitors connected in series form a pad capacitance and the pad inductance and the pad capacitance form a resonant frequency, wherein an alternating current ("AC") in the WPT pad resonates with respect to the resonant frequency to transfer power wirelessly through the WPT pad.

3. The WPT pad of claim 1, wherein two or more capacitors of the plurality of capacitors are connected between winding sections and form a capacitor group, wherein capacitance of each capacitor group combine to form a pad capacitance, wherein the pad capacitance along with a pad inductance form a selected resonant frequency.

4. The WPT pad of claim 3, wherein the two or more capacitors connected between winding sections have an overall current rating above a specified current value above a designed maximum current of the WPT pad.

5. The WPT pad of claim 1, wherein each capacitor of the plurality of capacitors is located in a container adjacent to the winding sections.

6. The WPT pad of claim 1, wherein the winding sections are wound around a center section and each capacitor of the plurality of capacitors is located in the center section.

7. The WPT pad of claim 1, wherein a first winding section of the plurality of winding sections is connected to a first terminal and a last section of the plurality of winding sections is connected to a second terminal, wherein the first and second terminals comprise an input to the WPT pad.

8. The WPT pad of claim 7, wherein an end of the first winding section and the last winding section not connected to the first and second terminals are connected to one or more capacitors of the plurality of capacitors.

9. The WPT pad of claim 1, wherein one or more capacitors of the plurality of capacitors which are connected between winding sections form a capacitor group.

10. The WPT pad of claim 9, further comprising a capacitor group comprising one or more capacitors of the plurality of capacitors connected between a winding section and a terminal.

11. A wireless power transfer ("WPT") pad comprising:
a plurality of capacitors, wherein one or more capacitors of the plurality of capacitors form a capacitor group, wherein the plurality of capacitors form a plurality of capacitor groups; and
a winding shaped for wireless power transfer, the winding divided into a plurality of winding sections,
wherein the winding sections and the capacitor groups are connected in series forming a series-connected winding comprising the winding sections and the capacitor groups and wherein a capacitor group of the plurality of capacitor groups is connected in series between two winding sections, and
wherein the winding sections are wound in parallel and in a spiral pattern that expands away from a center starting point.

12. The WPT pad of claim 11, wherein the winding comprises a pad inductance and the capacitors of the plurality of capacitors form a pad capacitance and the pad inductance and the pad capacitance form a resonant frequency, wherein an alternating current ("AC") in the WPT pad resonates with respect to the resonant frequency to transfer power wirelessly through the WPT pad.

13. The WPT pad of claim 11, wherein each capacitor group is identical.

14. The WPT pad of claim 11, wherein each capacitor group comprises two or more capacitors and wherein an overall current rating of each capacitor group is greater than or equal to a current rating of a winding section.

15. The WPT pad of claim 11, wherein a first winding section of the plurality of winding sections is connected to a first terminal and a last section of the plurality of winding sections is connected to a second terminal, wherein the first and second terminals comprise an input to the WPT pad and wherein an end of the first winding section and the last winding section not connected to the first and second terminals are connected to a capacitance group of the plurality of capacitance groups.

16. A wireless power transfer ("WPT") system comprising:
a rectification circuit that receives alternating current ("AC") power and produces direct current ("DC") power;
a resonant converter that receives the DC power; and
a WPT pad connected to the resonant converter that transfers power wirelessly to a secondary WPT pad, the WPT pad comprising:
a plurality of capacitors, wherein one or more capacitors of the plurality of capacitors form a capacitor group, wherein the plurality of capacitors form a plurality of capacitor groups, wherein each capacitor group is identical; and
a winding shaped for wireless power transfer, the winding divided into a plurality of winding sections,
wherein the winding sections and the capacitor groups are connected in series forming a series-connected winding comprising the winding sections and the capacitor groups and wherein a capacitor group of the plurality of capacitor groups is connected in series between two winding sections, and
wherein the winding sections are wound in parallel and in a spiral pattern that expands away from a center starting point.

* * * * *